United States Patent [19]
Darsey

[11] Patent Number: 5,257,339
[45] Date of Patent: Oct. 26, 1993

[54] PACKAGE OF OPTICAL FIBER SUITABLE FOR HIGH SPEED PAYOUT

[75] Inventor: Ralph J. Darsey, Lawrenceville, Ga.

[73] Assignee: AT&T Bell Laboratories, Murray Hill, N.J.

[21] Appl. No.: 921,546

[22] Filed: Jul. 29, 1992

[51] Int. Cl.$^5$ .............................................. G02B 6/22
[52] U.S. Cl. .................................... 385/128; 385/102; 385/123
[58] Field of Search ............... 385/128, 102, 123, 124, 385/125, 126

[56] References Cited

U.S. PATENT DOCUMENTS

| | | | |
|---|---|---|---|
| 2,639,097 | 5/1953 | Scott | 242/19 |
| 4,482,204 | 11/1984 | Blyler, Jr. et al. | 385/128 X |
| 4,950,049 | 8/1990 | Darsey et al. | 350/96.30 |
| 4,962,992 | 10/1990 | Chapin et al. | 350/96.23 |

*Primary Examiner*—John D. Lee
*Assistant Examiner*—Phan T. Heartney
*Attorney, Agent, or Firm*—Edward W. Somers; Donald E. Hayes, Jr.

[57] ABSTRACT

An optical fiber package (15) includes a support surface such as a hub of a bobbin (17) for convolutions of a length of optical fiber. The optical fiber includes a light transmitting portion such as a core and a cladding with inner and outer layers of coating material disposed thereabout. The coating material comprises an ultraviolet light curable material. Disposed throughout the curable coating material of the outer layer is an adhesive constituent which after having been solidified by the exposure of the optical fiber to ultraviolet light energy and subsequent to the winding of the optical fiber into a package for use in high speed payout is subjected to heat treatment to cause the adhesive constituent of each convolution to become tacky and cause the convolutions to be tacked together. The adhesion between adjacent convolutions is less than that between inner and outer layers of the coating materials and that between the inner layer and the cladding. As a result, the convolutions are held together in the package to provide a stable package but during payout separate without causing delamination of the layers of coating material.

5 Claims, 2 Drawing Sheets

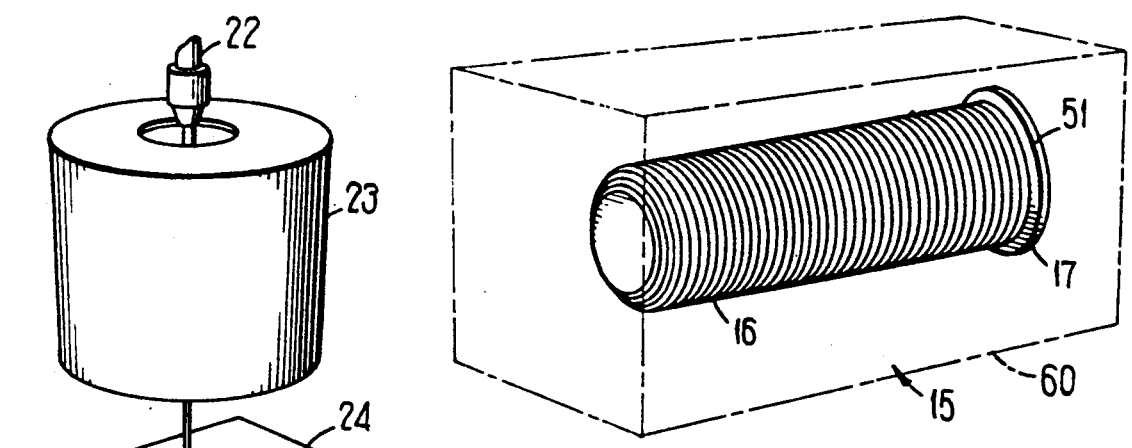
FIG 1
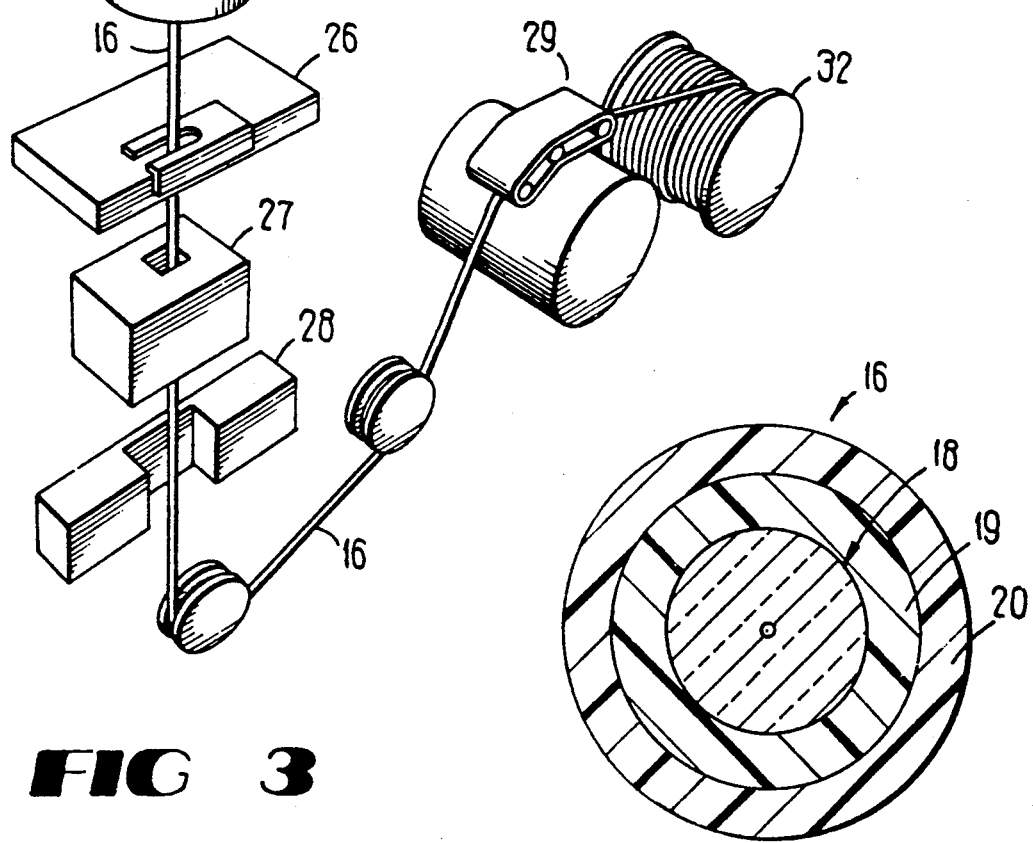
FIG 3
FIG 2

PACKAGE OF OPTICAL FIBER SUITABLE FOR HIGH SPEED PAYOUT

TECHNICAL FIELD

This invention relates to a package of optical fiber suitable for high speed payout. More particularly, this invention relates to a package of a relatively long length of optical fiber, the package being suitable for use in tethered vehicle control systems.

BACKGROUND OF THE INVENTION

Optical fiber has become a widely accepted form of transmission media. The use of optical communications involving the use of optical fibers has grown at an unprecedented pace. A continuous length of the fiber is drawn from an optical preform which may be made by any one of several known processes. Afterwards, or as part of a tandem process, the drawn fiber is coated, cured, measured and taken up, desirably in an automatic takeup apparatus, on a spool. Typically, an optical fiber has a diameter on the order of 125 microns, and is covered with coating material which increases the outer diameter of the coated fiber to about 250 microns, for example.

The spool on which the optical fiber is taken up has other uses. It is used to store the optical fiber, to pay out and to take up the fiber for other operations such as ribboning, cabling, and rewinding and is used to ship optical fiber which is wound thereon to other companies which further process the fiber. Also, it may be used in weapons and communications systems in which it may be attached to a control station.

Weapons and communications systems which use an optical fiber for two-way data communication between two or more moving bodies or between a moving body and a guidance station have been developed or are under development. Such uses include communication lines between aircraft, between an aircraft and a ship, and between a projectile, such as a missile, and a control station at a launch site, for example. Advantageously, the use of optical fiber for these kinds of communication precludes electromagnetic interference and undesired interception.

There are, however, in using optical fiber certain disadvantages, not present in other forms of communication. Optical fiber is less robust than metallic conductors, rendering it subject to breakage. Aside from breakage, optical fiber communication performance may be degraded by microbends in the fiber which are generated by bending or by other stresses to which the fiber is subjected. Such damage to an optical fiber not only reduces the long-term durability of the fiber, but also causes losses in the strength and in the content of the optical signal.

A typical optical fiber application in a weapons systems involves the packaging of a continuous length of optical fiber on a carrier bobbin which is positioned inside a vehicle. Such a vehicle commonly is referred to as a tethered vehicle. One end of the fiber is attached to operational devices in the vehicle, whereas the other end of the fiber is connected to a control or communications station at a launch site. During and after launch, two-way communication with the vehicle is conducted.

In order to use such an arrangement, there must be provided a reliable and compact package of the optical fiber which may be disposed within the vehicle and which will permit reliable deployment of the optical fiber during the flight of the vehicle. The use of metallic conductors for guidance or control of launched vehicles is known. See, for example, U.S. Pat. Nos. 3,114,456, 3,156,185 and 3,319,781. As mentioned hereinabove, the characteristics of optical fiber present difficulties not involved in the use of metallic conductors for communication. Specialized treatment is required to facilitate the unwinding of the optical fiber from its carrier bobbin at a relatively high rate of speed.

A problem in the optical fiber guidance of tethered vehicles relates to the successful unwinding of the fiber from a carrier bobbin as the bobbin is propelled along with the vehicle. The leading end of the optical fiber is connected to a guidance system for controlling the path of travel of the vehicle. It becomes important for the optical fiber to be payed off from the bobbin without the occurrence of snags, otherwise the fiber may break and the control system rendered inoperable. Contributing to the successful payout of the optical fiber is a precision wound package. Further, not only must the convolutions be wound with precision, they also must remain in place as wound during handling and when deployed. In other words, the optical fiber package must be a highly stable one. On the other hand, payout must occur easily without the necessity of high pulling forces to remove each convolution of fiber from the carrier bobbin.

In some optical fiber packages for use in tethered vehicles, many layers of optical fiber are wound on a base layer of wire. An adhesive material between the optical fiber turns functions to hold the package together, forming a stable structure which is resistant to environmental extremes, shock and vibration. Desirably, the adhesive material which is used to hold together the convolutions must have a minimal impact on the optical performance of the wound optical fiber, and yet it must allow the optical fiber to be payed out with a controlled force at the peel-off point as the outermost turn is unwound at high speed. These requirements present somewhat conflicting requirements for the adhesive system.

During storage and transport of the carrier bobbin, mechanical stability is most important as the adhesive adds integrity to the wound package thereby maintaining the package in a ready condition for deployment. During deployment, both mechanical and optical effects are significant. The adhesive system must provide tackiness which is sufficiently low to permit a helical pattern of payout at speeds which may be relatively low to speeds which may be in the supersonic range. Excessive tackiness threatens fiber integrity by forming an extreme bend at the peel-off point. On the other hand, not enough tack may result in failure through dynamic instability on the bobbin surface. With respect to optical performance, optical attenuation at the peel off-point of each successive convolution may occur through localized macrobending, degrading the integrity of data and video transmission. Typical peel-off point attenuation of each successive convolution may contribute 3 or more dB to the overall loss.

Also, it has been found that microbending in the layers of undeployed fiber in the bobbin during deployment can affect adversely optical performance. It has been found that the adhesive material can contribute significantly to attenuation increases, especially at lower temperatures.

Current techniques for providing a sought-after stable package include providing a length of optical fiber to be wound with an adhesive material which is not tacky at room temperature but which becomes tacky at a predetermined temperature. After the optical fiber has been precision mound wound on a bobbin, the bobbin is subjected to the predetermined temperature to cause the adhesive material to become tacky and cause each convolution to adhere to at least a portion of adjacent convolutions. The adhesion is sufficient to cause a precision wound package to be maintained, but is such as to allow separation of convolutions during payout without the occurrence of breaks. See U.S. Pat. No. 4,950,049 which issued on Aug. 21, 1990 in the names of R. J. Darsey, J. W. Shea, and C. R. Taylor.

Although the just-described arrangement overcomes the problem of providing a stable package which gives acceptable payout, the process of providing the package requires the steps of applying an adhesive material to portions of the outer surfaces of the convolutions and curing same. What is needed and what seemingly is not available in the prior art is a package of optical fiber suitable for high speed payout which is provided with reduced processing steps. What is desired is a package of optical fiber suitable for high speed payout and capable of being manufactured with minimum incremental cost over conventionally made optical fiber.

SUMMARY OF THE INVENTION

The foregoing problem of the prior art has been overcome with the optical fiber package of this invention. A package of optical fiber which is suitable for high speed payout comprises means for supporting a mass of wound convolutions and a length of optical fiber which is wound in convolutions and supported by said means. The optical fiber includes a light transmitting portion and a layer of a coating material which is disposed about the light transmitting medium. The layer of coating material is effective to protect the light transmitting portion against microbending and mechanical damage and includes a constituent which when cured causes adhesion between the layers of coating material of contiguous convolutions.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of an optical fiber package;

FIG. 2 is an end cross sectional view of optical fiber which is wound on a bobbin to provide the package of FIG. 1;

FIG. 3 is a perspective view of a manufacturing line on which optical fiber is drawn from a preform and taken up;

DETAILED DESCRIPTION

Figure 4:
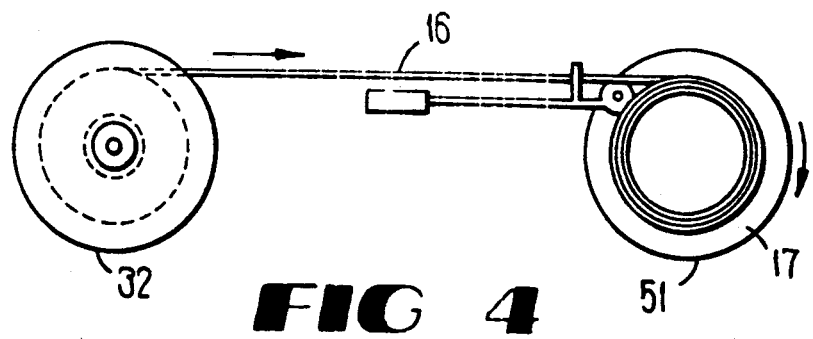
FIG. 4 is a schematic view of the transfer of optical from loosely wound convolutions on a process spool to the precision wound package on a carrier bobbin.

Referring now to FIG. 1, there is shown a package 15 of a length of coated optical fiber 16 which is wound in convolutions supported by a surface such as by a hub of a flanged bobbin 17. The optical fiber 16 typically includes a light transmitting portion 18 such as a core and a cladding and at least one layer of a coating material (see FIG. 2). In FIG. 2, the optical fiber 16 is shown as including two layers of radiation cured coating materials. An inner layer 19 of a primary coating material protects the fiber from microbending and an outer layer 20 of a secondary coating material protects the fiber from mechanical damage. The coating materials of the two layers for fiber herein are the same.

Referring now to FIG. 3, there is shown an apparatus which is used to draw the light transmitting portion 18 from a specially prepared cylindrical preform 22 and then to coat the optical fiber. The optical fiber light transmitting portion is formed by locally and symmetrically heating the preform 22 to a temperature of about 2000° C. As the preform 22 is fed into and through a furnace 23, the light transmitting portion 18 is drawn from the molten material.

As can be seen in FIG. 1, the draw system includes the furnace 23, wherein the preform 22 is drawn down to the optical fiber size, after which the light transmitting portion 18 is pulled from the heat zone. The diameter of the portion 18 which is measured by a device 24 at a point below the furnace 23 becomes an input into a control system. Within the control system, the measured diameter is compared to the desired value and an output signal is generated to adjust the draw speed such that the fiber diameter approaches the desired value.

After the diameter of the uncoated fiber is measured, a protective coating system is applied by an apparatus 25 to provide the coated optical fiber 16. One method of applying dual layers 19 and 20 of coating materials to a moving optical fiber is disclosed in U.S. Pat. No. 4,474,830 which issued on Oct. 2, 1984, in the name of C. R. Taylor.

Then, after the coated optical fiber 16 is passed through a concentricity gauge 26, an ultraviolet light (UV) device 27 for treating the coating material to cure the coating material and a device 28 for measuring the outer diameter of the coated fiber, it is moved through a capstan 29 and is taken up on a spool 32 for testing and further processing.

A coating system (see FIG. 2) which is applied to the optical fiber after it has been drawn from the preform preferably comprises the two layers 19 and 20 of a radiation cured polymeric material. Although the coating materials are applied herein in two layers, it should be understood that the coating material could be applied as one layer.

As for the coating material, its microbend performance must be viewed with respect to its modulus and glass transition temperature $T_g$. A plot of the log of modulus versus temperature for a secondary coating material is shown in FIG. 10 of U.S. Pat. No. 4,962,992 which is issued on Oct. 16, 1990 in the names of J. T. Chapin, et al. and which is incorporated by reference hereinto. For the coating material of the coated optical fiber 16, the glass transition temperature is in the range of about 20° to 60° C. Preferably, it is about 40° C. If the glass transition temperature were below 20° C., the robustness of the optical fiber would be too low for handling in factory conditions because the secondary material would be too soft. If the glass transition temperature of the coating material is too high, delamination of the coating system from the optical fiber may occur, that is, there is an increased tendency for the coating material to be lifted from the glass. A material which is suitable for the outer layer of coating material is one commercially available from De Soto, Inc. of Des Plaines, Ill. under the designation 950-103. Further characterization of a suitable coating material is provided in the description of the secondary coating material in U.S. Pat. No. 4,962,992.

The precision wound package and the retention of the convolutions in the package during handling and movement prior to payout require that there be suitable tackiness between adjacent convolutions. In order to provide suitable tackiness between adjacent convolutions of the optical fiber, the outer layer of coating material includes an adhesive constituent. It has been found that a suitable adhesive constituent is a polyvinyl butyral.

As the coated optical fiber 16 is moved through the UV curing apparatus 27, the UV curable coating materials are solidified. Also, the adhesive constituent, preferably the polyvinyl butyral, is solidified and is uniformly disposed throughout the UV curable materials. Then, as mentioned hereinbefore, the coated optical fiber is taken up on a spool.

In the preferred embodiment, as mentioned hereinabove, the adhesive material is a polyvinyl butyral. The polyvinyl butyral in powder form may be mixed with a suitable solvent which acts as a dispersant and then mixed with the coating material of the outer layer. The bath in the applicator 25 comprises a mixture comprising polyvinyl butyral and a solvent as well as the coating material. In the preferred embodiment, the solvent is methyl ethyl ketone.

Adhesive materials other than polyvinyl butyral may be included in the coating material of the optical fiber to provide the stable package. Other materials that can form interfacial bonding by heat treatment or solvent exposure may be used.

What is important is that the adhesive material must meet particular requirements. It must be capable of being applied to an optical fiber preferably in a liquid state in the same apparatus which is used to apply the coating material to the drawn optical fiber and then caused to be tack-free when it is wound on a process spool. Also, the adhesive material must be capable of being treated subsequently so that it causes adhesive bonds to be developed between at least portions of adjacent convolutions of the optical fiber which are wound on a carrier bobbin. The bonding must be such not only that the resulting optical fiber package is stable, but also, it must allow the optical fiber convolutions to be payed off from a carrier spool without damage to the fiber.

The spool 32 of loosely wound optical fiber and another spool which is designated a deployment or carrier bobbin and which is designated by the numeral 17 are arranged for a rewind operation (see FIG. 4). Generally, the bobbin 17 may be made of a metallic, plastic or a composite material and has a hub which is tapered slightly from a flange 51 (see FIG. 1). During that operation, the optical fiber is rewound from a plurality of loosely wound convolutions to the precision wound package 15 comprising a plurality of layers (see FIG. 1) each comprising a plurality of tightly wound convolutions. For this rewinding operation, the tension in the optical fiber is about 100 grams. The precision winding operation which may be carried out in a process such as is shown in U.S. Pat. No. 4,746,080, for example, is time consuming, being accomplished at a relatively low line speed.

Of course, it should be realized that the optical fiber having the layer of adhesive material thereon may be caused to be disposed in convolutions not wound on a spool or bobbin. Such a package may very well be payed out from a center point rather than from outer portions of the package. Or the convolutions of optical fiber having the adhesive material applied thereto may be wound on a collapsible arbor (not shown), after which the arbor is removed to provide a stable package.

Following the rewind operation, the precision wound package 15 of optical fiber is treated to activate the adhesive material and to cause at least portions of adjacent convolutions to bond molecularly to each other. The bobbin 17 of packaged optical fiber is positioned in a treating facility 60 (see FIG. 1) wherein the adhesive material is treated to develop bonds between contiguous portions of the convolutions of the optical fiber.

Figure 5:
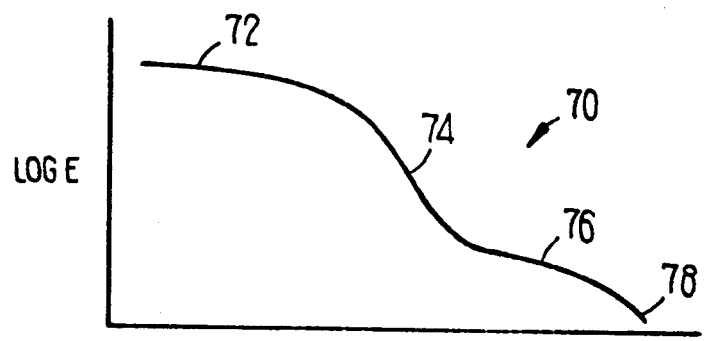
FIG. 5 is a graph which depicts the behavior of one parameter of a thermoplastic material as it is subjected to heat treatment.

Referring now to FIG. 5, there is shown a curve 70 which depicts the modulus behavior of a thermoplastic material such as the mixture of coating material and adhesive constituent of the outer layer 20. At room temperature, or in the range of temperatures in which the optical fiber is used, i.e. less than about 70° C., the material is in a glassy zone which is designated generally by the numeral 72. At that time, it is non-tacky. Then, as the temperature increases, the modulus decreases, descends through a transition zone 74 and subsequently becomes rubbery along portions 76 and 78. The degree of tack depends on the length of time during which the thermoplastic material is exposed to elevated temperatures and the values of these temperatures. Bonding is enhanced by heating in the range shown for those portions 74, 76, or 78 of the graph, depending on the amount of bonding which is desired. For some materials, bonding in the transition zone may be sufficient.

Referring now to FIGS. 9-12 of previously mentioned U.S. Pat. No. 4,950,049 which is incorporated by reference hereinto, there are shown a sequence of views which depict the formation of bonds across an interface between the adhesive material on one convolution and that on another convolution. For a thermoplastic material, molecular bonding occurs following the interpenetration or migration of chains of which the plastic material is comprised across interfacial boundaries between contiguous portions of the adhesive material on adjacent convolutions.

The amount of bonding is related to the amount of chain penetration that occurs across the contiguous portions of the convolutions. Also, the amount of bonding increases for increasing temperatures to which the adhesive material is exposed or to increasing time during which it is exposed at a given temperature. FIGS. 10-12 of U.S. Pat. No. 4,950,049 illustrate increased bonding as the temperature passes through the regions 74, 76 and 78. The required amount of bonding for a particular application will determine the time or temperature or both to which the optical fiber is exposed.

Because of the bonding or molecular migration, as it is often termed, across the interfaces, the convolutions of the optical fiber are held together by suitable adhesion. Portions of the convolutions are not adhered together across the interface prior to treatment. When subjected to treating apparatus, the adhesive material on contiguous portions of the adjacent convolutions on the bobbin 17 begin to develop bonds across the interface. After exposure to a predetermined temperature for a predetermined time, sufficient bonding across the interface is established to hold together the convolutions. As a result, a stable package of wound fiber is provided. It may be handled with confidence so that the convolutions will remain in place. However, the adhesion is not so great as to impede payoff of the optical fiber from the bobbin. At the expected tension levels, each successive convolution separates from adjacent convolutions without any damage to the optical fiber occurring. It must be recognized that it is only at the contact points between adjacent convolutions that migration occurs to establish bridging chains across the interface.

What is important is that the adhesion between convolutions fails prior to any delamination between layers of coating material and/or between the coating material and the glassy portion of the fiber. Otherwise, the optical fiber would be exposed and damage will most likely occur.

What is further important is that desired adhesion can be caused to occur with any suitable adhesive material for which molecular bonding can occur across an interface between contiguous portions of adjacent convolutions as a result of suitable treatment. During treatment of any such suitable material, migration across the interfaces between contiguous portions occurs. Upon cooling, a bond is established across that interface to hold the convolutions securely in place. Also, during treatment, it is important to recognize that the coating material is not affected adversely.

For polyvinyl butyral, the treating temperature range is about 70° C. to about 120° C. For other suitable materials, the treatment temperature range may be different. That time or temperature or that desired level of bonding will be based on the properties of the adhesive material used.

The treating temperature may be provided by a number of suitable apparatus. For example, the facility could include an oven or a microwave heating facility. Microwave energy may be caused to couple to the adhesive material to heat it. When microwave energy is used to increase the temperature of the adhesive material, the bobbin 17 is made of a non-metallic material. In another technique, a vacuum may be used to withdraw air from interstices between the convolutions. A vapor or liquid material is introduced to cause contacting portions of convolutions to stick together. Then vacuum is reapplied to remove the excess material.

By controlling the degree of tack between the convolutions on the precision wound bobbin 17 caused by the adhesive constituent in the coating material, damage to the fiber during high speed unwinding is avoided. Of course, the tack time and temperature will depend on the particular adhesive material which is applied to the optical fiber.

For a thermoplastic material at the interface between adjacent convolutions, the transition of the thermoplastic material as shown in FIG. 5 is reversible. As the adhesive material cools, the region of bonding along contiguous portions of adjacent convolutions is immobilized or frozen in and is stable with time. When the optical fiber is cooled to ambient temperatures, the interfacial bonding is preserved at levels achieved during the higher temperature exposure. Those portions of the surfaces which are not bonded return to a glassy state, as can be seen from FIG. 5. The use of a glassy, adhesive material which is tack-free at room temperature facilitates high speed, uniform coating of optical fiber and the winding of convolutions thereof on a bobbin. The adhesion is generated and controlled by the tacking of the thermoplastic material in the transition and/or rubbery zones.

The return of those quadrants of the adhesive material on the optical fiber which are not contiguous to portions of adhesive material on adjacent convolutions to a glassy state upon cooling is beneficial. These surfaces are characterized by a relatively low coefficient of friction. These low coefficient of friction, glassy surfaces facilitate the high speed payout of the optical fiber. If the surfaces were not so characterized, payout, which involves portions of each convolution sliding over a portion of a surface of other convolutions, may cause some of the adjacent convolutions to become dislodged prematurely and cause package disruption. This undesired occurrence may become manifested in the payout of multiple convolutions which could lead to entanglements. This is especially likely to happen when those convolutions adjacent to the flange 51 of the bobbin 17 are payed out in a direction generally parallel to a longitudinal axis of the bobbin and toward an unflanged end thereof. Advantageously, the low coefficient of friction portions of the surfaces of the convolution which are not adhered avoid multiple payout with each convolution being pulled easily over surfaces of other convolutions.

Figure 6:
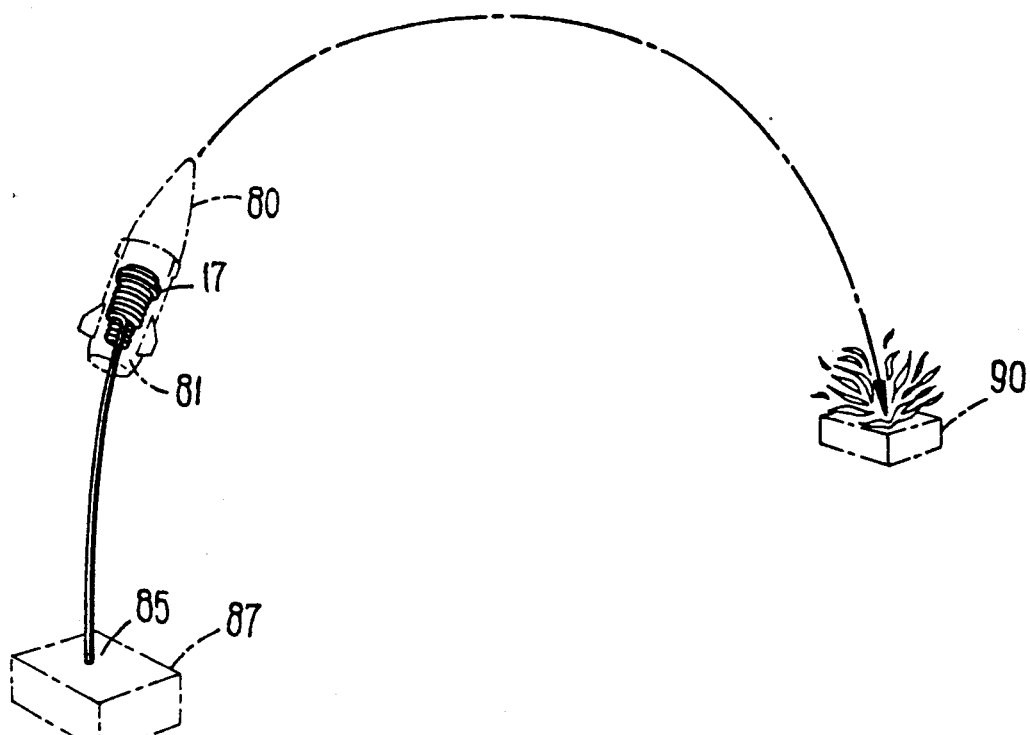
FIG. 6 is a schematic view which shows a use of a stable package of this invention.

The precision wound optical fiber package 15 may be used, for example, to control the flight path of a missile. In such an environment, a bobbin 17 with the optical fiber wound thereon is mounted in a missile 80 (see FIG. 6). An inner end 81 of the optical fiber is connected to devices within the missile and a leading end 85 of the fiber is connected to a control station 87. Following the launching of the missile, the flight path may be controlled by the control station 87 which communicates with the missile 80 through the coated optical fiber 16. As the missile moves from the control station 87 to a target 90, the optical fiber is payed off from the unflanged end of the bobbin 17 to maintain communications between the control station and the missile.

It is to be understood that the above-described arrangements are simply illustrative of the invention. Other arrangements may be devised by those skilled in the art which will embody the principles of the invention and fall within the spirit and scope thereof.

I claim:

1. A package of optical fiber which is suitable for high speed payout, said package comprising:
   means for supporting a mass of convolutions;
   a length of optical fiber which is disposed in convolutions and supported by said means, said optical fiber including
   a light transmitting portion;
   a coating material which is disposed about said light transmitting portion, said coating material being effective to protect said light transmitting portion against microbending and mechanical damage and including a constituent which when cured causes adhesion between the coating material of contiguous convolutions.

2. A package of optical fiber which is suitable for high speed payout, said package comprising:
   means for supporting a mass of wound convolutions;

a length of optical fiber which is wound in convolutions and supported by said means, said optical fiber including:

a light transmitting portion;

an inner layer of a coating material which is disposed about said light transmitting portion; and an outer layer of said coating material which is disposed about said inner layer and which includes a constituent which when cured causes adhesion between outer layers of coating material of contiguous convolutions.

3. The package of claim 2, wherein said constituent is such that upon suitable treatment said consituent bonds across an interface between portions of adjacent convolutions, the outer layer on contiguous portions of said optical fiber being adhered together by bonds and on other portions of said optical fiber having an outer surface which is characterized by a relatively low coefficient of friction.

4. The package of claim 2, wherein said constituent includes polyvinyl butyral.

5. An adherent optical fiber, which comprises:

a length of optical fiber which is capable of being disposed in a configuration such that a portion of an outer surface thereof becomes juxtaposed an adjacent surface to which said portion of said outer surface of said optical fiber is to become adhered; and a coating material which is disposed about said optical fiber, said coating material including a constituent which when exposed to suitable treatment causes adhesion with another portion of optical fiber to which has been applied said coating material and exposed to said suitable treatment.

* * * * *